US008270730B2

(12) United States Patent
Watson

(10) Patent No.: US 8,270,730 B2
(45) Date of Patent: Sep. 18, 2012

(54) TARGET ORIENTATION

(75) Inventor: Graham Howard Watson, Farnborough (GB)

(73) Assignee: Qinetiq Limited, London (GB)

( * ) Notice: Subject to any disclaimer, the term of this patent is extended or adjusted under 35 U.S.C. 154(b) by 721 days.

(21) Appl. No.: 12/375,992

(22) PCT Filed: Aug. 14, 2007

(86) PCT No.: PCT/GB2007/003109
§ 371 (c)(1),
(2), (4) Date: Feb. 6, 2009

(87) PCT Pub. No.: WO2008/023149
PCT Pub. Date: Feb. 28, 2008

(65) Prior Publication Data
US 2010/0002942 A1    Jan. 7, 2010

(30) Foreign Application Priority Data

Aug. 23, 2006   (GB) ................................. 0616688.8

(51) Int. Cl.
*G06K 9/62* (2006.01)
*G06K 9/00* (2006.01)
(52) U.S. Cl. ........................................ 382/218; 382/103
(58) Field of Classification Search .................. 382/218, 382/154, 170
See application file for complete search history.

(56) References Cited

U.S. PATENT DOCUMENTS

| 5,275,354 A | | 1/1994 | Minor et al. |
| 5,341,142 A | * | 8/1994 | Reis et al. ........................ 342/64 |
| 5,394,151 A | | 2/1995 | Knaell et al. |
| 5,524,845 A | * | 6/1996 | Sims et al. .................... 244/3.17 |
| 5,644,386 A | | 7/1997 | Jenkins et al. |
| 5,724,447 A | * | 3/1998 | Fukushima .................... 382/211 |
| 5,893,085 A | | 4/1999 | Phillips et al. |
| 6,042,050 A | | 3/2000 | Sims et al. |
| 6,466,372 B1 | * | 10/2002 | Morris et al. ................. 359/567 |
| 6,677,941 B2 | | 1/2004 | Lin |
| 7,930,073 B2 | * | 4/2011 | Glauser et al. .................... 701/7 |
| 2003/0190091 A1 | * | 10/2003 | Stewart et al. ................ 382/294 |

(Continued)

FOREIGN PATENT DOCUMENTS

WO   WO 99/02344 A1   1/1999

(Continued)

OTHER PUBLICATIONS

Pose-Independent Automatic Target Detection and Recognition Using 3D Laser Radar Imagery Alexandru N. Vasile and Richard M. Marino; Mar. 2005.*

(Continued)

*Primary Examiner* — Chan S Park
*Assistant Examiner* — Nancy Bitar
(74) *Attorney, Agent, or Firm* — Oliff & Berridge, PLC

(57) ABSTRACT

A method of target recognition performs a 3D comparison of target and reference data. Translation invariant signatures are derived from the two data sets, and an estimate of the orientation of the target with respect to the reference is obtained. Rotational alignment and comparison can then be achieved. The 3D data sets can be represented on an axi-symmetric surface such as a sphere and rotational convolution, over a discrete set of selected rotation angles can be performed. Optic flow can be used to derive the estimate of orientation or the target relative to the reference, in terms of a displacement field.

17 Claims, 2 Drawing Sheets

U.S. PATENT DOCUMENTS

2004/0252889 A1 12/2004 Liu et al.
2006/0273946 A1* 12/2006 Krikorian et al. ........... 342/25 A

FOREIGN PATENT DOCUMENTS

WO      WO 00/62245 A1    10/2000

OTHER PUBLICATIONS

Lucchese, L. et al., "A Frequency Domain Technique for Range Data Registration." *IEEE Transactions on Pattern Analysis and Machine Intelligence*, Nov. 2002, vol. 24, No. 11, p. 1468-1484.

Search Report issued in British Patent Application No. GB0616688.8 dated May 2, 2007.

Office Action issued in European Patent Application No. 07 789 226.3 dated Jun. 21, 2011.

Bribiesca; "Measuring 3-D Shape Similarity Using Progressive Transformations," *Pattern Recognition*; 1996; pp. 1117-1129; vol. 29, No. 7.

Paquet et al.; "Invariant pattern recognition for range images using the phase Fourier transform and a neural network;" *Optical Engineering*; Apr. 1995; pp. 1178-1183; vol. 34, No. 4.

Jiao et al.; "Invariant Descriptor of Fourier-Mellin for Indexing by Contents a Database of Three Dimensional Images; " *ICSP'02 Proceedings*; 2002; pp. 858-860.

Vasile et al.; "Pose-Independent Automatic Target Detection and Recognition Using 3D Laser Radar Imagery;" *Lincoln Laboratory Journal*; 2005; pp. 61-78; vol. 15, No. 1.

Pech-Pacheco et al.; "Automatic object identification irrespective of geometric changes;" *Optical Engineering*; 2002; pp. 1-22.

* cited by examiner

TARGET ORIENTATION

This invention relates to target orientation and recognition and particularly, but not exclusively, to the comparison of 3D target data to 3D reference models.

A particularly suitable method for obtaining 3D target data is Laser 3D imaging, commonly referred to as light detection and ranging (LIDAR) or laser detection and ranging (LADAR). This images a 3D solid object and defines a set of visible points on its surfaces, where the range and direction of each point from a viewpoint are known to within a small tolerance.

Methods of target recognition using 2D data are well known, and utilise image correlation techniques. Examples of such 2D methods include WO99/23444 in which hierarchical segmentation and classification of images is performed and U.S. Pat. No. 5,524,845 which uses a 2D correlation of a complex transform of an acquired image.

Techniques have been proposed to extend 2D target recognition to 3D target data. A method is proposed in "Pose-Independent Automatic Target Recognition Using 3D Laser Radar Imagery, Alexandru N. Vasile and Richard M. Marino, Lincoln Laboratory Journal Vol 14 No 1, 2005" to use spin imaging surface matching to correlate 3D target data with 3D reference data. This method samples the data at a number of discrete points to provide transformation invariant 2D images. These images can then be compared to similarly derived images from a reference model, using 2D template matching.

True 3D matching of a target to a reference however is a nine degree of freedom problem (3 axes of translation, 3 axes of rotation and 3 axes over which to calculate the match score) and is therefore a computationally expensive task.

It is therefore an object of the present invention to provide an improved method of target recognition for a 3D data set.

According to a first aspect of the invention there is provided a method of target recognition comprising the steps of providing a set of 3D data corresponding to a reference object; obtaining a set of 3D data corresponding to a target object; deriving a translation invariant 3D signatures for each of the 3D data sets; comparing the translation invariant 3D signatures for the reference object and the target object to derive an estimate of the orientation of the target with respect to the reference data; bringing the target data and reference data into rotational alignment according to said derived estimate of orientation; and comparing the aligned target data with the reference data and deriving a measure of similarity based on said comparison.

The orientation and translation of the models is a very computationally expensive task with nine-degrees of freedom (3 axes of translation, 3 axes of rotation and 3 axes over which to calculate the match score). The efficiency of the algorithm is increased by splitting the algorithm into two stages, orientation and translation, with the orientation stage being invariant to the translation of the model (i.e. the calculation of target orientation does not depend on the relative translation between the target and reference model).

Performing a 3D comparison between the two data sets provides a reliable and robust technique for estimating orientation, using global data. In one embodiment, in order to reduce the computational complexity of the 3D comparison, the 3D target data and the 3D reference data are represented on the surface of a sphere. In this way the shape of the data is rotationally invariant. In embodiments where only a single axis of rotation is being considered, then the data can be represented on an axisymmetric surface, such as a cylindrical surface, maintaining the property that the shape of the data is invariant with rotation about that axis.

The translation invariant signature is preferably obtained by calculating the modulus of the 3D transform of the data set. The transform is preferably the Fourier Transform or an FFT, but other transforms such as the covariance matrix will be apparent to the skilled person.

The derived estimate of the orientation of the target with respect to the reference data can advantageously be refined by calculating the optic flow between the 3D target data and the 3D reference data. Calculating the optic flow typically comprises rotationally aligning the target data and the reference data according to an initial estimate of orientation; deriving a translation invariant signature for the rotationally aligned data sets; and determining the displacement field between the signatures.

A further aspect of the invention provides a method for estimating the orientation of a set of 3D data with respect to a reference set of 3D data, the method comprising deriving a translation invariant 3D signature of the 3D datasets, and performing a rotational convolution of the translation invariant signatures.

The translation invariant 3D signatures are advantageously represented on an axisymmetric surface, preferably the surface of a sphere.

A still further aspect of the invention provides a method of terrain removal from 3D target object data, said method comprising expressing the 3D target object data as height data; applying a linear transform to said height data; comparing said transformed height data to a threshold; and rejecting data points whose transformed height data is less than said threshold.

In one aspect of the invention the autocorrelation function of the transformed data is zero except at zero.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, in the context of a complete target recognition system, and with reference to the accompanying drawings, in which.

PRE-PROCESSING

Figure 1A:
FIG. 1 illustrates a set of 3D LIDAR data
Figure 1B:
Figure 2:
FIG. 2 illustrates a set of 3D Cartesian data

FIG. 1 illustrates a set of 3D LIDAR data, FIG. 1a showing range data and FIG. 1b showing intensity data representing the signal strength of each point in the range data. The raw data is processed to provide a data set in 3D Cartesian coordinates as illustrated in FIG. 2. 3D LIDAR data is processed to remove points associated with terrain or clutter, and to retrieve any possible targets from within the scene. The pre-processing stage is split into a several stages, described in more detail below:

A terrain removal process segments possible targets from the terrain.

Possible targets from within the remaining 3D data are identified

For each possible target the local terrain gradient is calculated and can be used as an initial estimate of the target tilt angle.

LIDAR images are centred on a possible target. This in combination with the LIDAR range data will provide an estimate for the range of the target. Using this information, the LIDAR data can be range gated to remove all data points that are much more or much less distant than the target. This process, along with a threshold on the intensity of the LIDAR returns, removes a large proportion of the irrelevant LIDAR data. The remaining data will still include terrain in the neighbourhood of the target.

The function of the terrain removal algorithm is to select points whose height gradients (slopes) are too large to be consistent with natural terrain, which will include the target's boundary. After filling in the region within this boundary, the target segmentation is complete.

Three-dimensional LIDAR data is first converted into a two-dimensional height map, showing the highest data point in each grid cell. In the vast majority of cases this height map is incomplete (due to occlusion or poor reflection of the LIDAR radiation). These missing data points are interpolated using the following radial basis function with a smoothed exponential decay:

$$z(x, y) = \frac{\sum_k z_k f\left(\sqrt{(x-x_k)^2 + (y-y_k)^2}\right)}{\sum_k f\left(\sqrt{(x-x_k)^2 + (y-y_k)^2}\right)}$$

$$f(r) = \exp\left(\frac{-r^2}{1+r}\right)$$

where $(x_k, y_k, z_k)$ are the two horizontal and vertical coordinate respectively of each data point and z is the required terrain height at the specified horizontal coordinates (x,y). A is a prescribed decay rate specifying the relative importance of terrain data in relation to its proximity to the interpolated point.

The next step is to select points with unusual height or height gradient using a simple statistical terrain model.

Natural terrain height is highly correlated. The cross correlation [Papoulis, "Probability Random Variables, and Stochastic Processes", McGraw-Hill, 1981] of height between a pair of points is inversely related to the distance between these points; the relationship between distance and cross correlation is given by the autocorrelation function [Papoulis]. For self-similar (fractal) random processes [Pietgen et al, "The Science of Fractal images", Springer-Verlag, 1988], from which natural terrain can be modelled, the autocorrelation function is a negative power of distance, where the power is typically in the range 1 to 2.

A linear transformation is applied to the height data to de-correlate the natural terrain, so that the heights of different points of the transformed data are not correlated, that is the autocorrelation function of the transformed data is zero except at zero. This process is known as whitening the height data. Under certain conditions (when the terrain height is a Gaussian random process [Papoulis]) the height at each point of the whitened data is distributed independently of the other points, so the likelihood of a point belonging to the natural terrain, after whitening, depends only on its height. By setting a threshold on absolute whitened height; all points below the threshold which are sufficiently likely to be part of the terrain (prior to other tests based on connectivity) can be rejected.

A suitable whitening transformation is to apply an FFT [William H. Press, et al, "Numerical Recipes in C", Cambridge University Press, 1992] to the height data, to produce a function of two frequency variables (u, v). Each value of this function f is then multiplied as follows:

$$f(u,v) \rightarrow f(u,v)(\sqrt{u^2+v^2})^b$$

where the power b is a measure of the spatial correlation in the original terrain height. This value may depend slightly on the type of terrain encountered, the degree of roughness. A value of 0.5 has been found to be effective for most types of terrain. Lastly, the inverse FFT [William H. Press, et al, "Numerical Recipes in C", Cambridge University Press, 1992] is applied to the result.

The above threshold for terrain removal is calibrated from each input data set; a prescribed multiple of the standard deviation of the inter-quartile subset of the whitened data is chosen. This method of choosing the threshold is largely unaffected by the target itself, as this typically generates data in the top or bottom quartiles.

The local gradient (ground slope) is estimated at the centre of mass of each target. The same interpolation process and smoothing kernel f are used to calculate a weighted average of the background height data as was used above to interpolate the raw terrain data. Here however, the missing data are those points that are classified as belonging to the target, rather than those that were occluded in the original scene. The gradient is estimated from numerical approximations of the partial derivatives of z with respect to x and y:

$$\frac{\partial z}{\partial x} \approx \frac{z(x+\delta, y) - z(x-\delta, y)}{2\delta}$$

$$\frac{\partial z}{\partial y} \approx \frac{z(x, y+\delta) - z(x, y-\delta)}{2\delta}$$

where δ is a small number compared to the dimensions of the target and (x,y) are the horizontal coordinates of the target centre of mass.

Target Orientation

The LIDAR signature of a potential target, having been pre-processed, is compared with a reference model, and an output a metric of similarity between the two is produced. The algorithm used rotates and translates the models to achieve a compatible position and orientation. Once the models are co-located and orientated, a goodness of fit test is applied to the models.

The following are the main stages of the process, each of which is described in greater detail below;

Determination of possible target orientations

Calculation of target pitch and roll angles

Refinement of target orientation

Corrections in reference data for occluded targets (targets that are partially hidden by other objects in the scene)

Calculation of the optimal translation of the target to the reference model

Optional final refinement of the target orientation and translation

Determine a score for the likelihood that target is the same class as the reference model A translation invariant signature of the reference data and the target data is used to calculate possible target orientations. This signature is based on the modulus of the 3D Fourier transform of the target and of the reference. This provides the translation invariance used by the algorithm.

A weighted intensity of each point is accumulated within grid cells of a pre-determined size resulting in data having a 3D grid format, in order to apply the Fourier transform. The Fast Fourier Transform (FFT) [William H. Press, et al, "Numerical Recipes in C", Cambridge University Press, 1992] is used to speed up the algorithm.

The result is a 3D Fourier volume which is translation invariant. The 3D Fourier volume for the reference data and the 3D Fourier volume for the target data can be compared over possible orientations to determine the orientation giving the best match.

Figure 3:
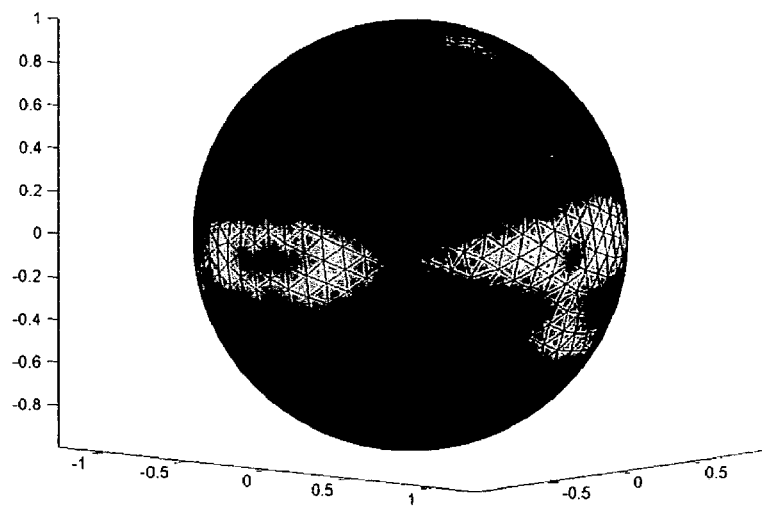
FIG. 3 shows an example of a translation invariant 3D data set

A direct comparison is possible but would be computationally expensive. In the present example, the 3D Fourier volume is interpolated onto the surface of a sphere in 3D Fourier space. FIG. 3 shows a representation of such a 3D data set.

A radius is selected to be compatible with the number of sample points to be selected for a given sample density. In the example of FIG. 3, 300 data points are distributed on the surface of the sphere. Alternatively a radius may be selected based on the distribution of frequency information, to ensure sufficient information for providing a good representation of the target and reference model. Sample points are evenly distributed on the surface of the sphere, and data values assigned by linear interpolation. As a result of this interpolation, rotational convolution of the data sets is greatly simplified because the surface is invariant to appropriate groups of Euclidean rotations.

Alternative methods of interpolation could include all of the Fourier data, by integrating along a radius to assign a value on the surface of the sphere.

Rotational convolution can then be used to estimate the difference in orientation between the translation invariant signatures of the target and the reference model. The maximum output of this calculation gives the most likely orientation of the target. The algorithm uses only a discrete set of angles for computational efficiency. Increments of 6 degrees have been found to provide acceptable accuracy whilst reducing the processing load.

This set can include any potential angle, but for surface targets this set can be reduced by using the initial estimate that the target is approximately parallel to the surface gradient calculated in the pre-processing stage, or even assumed to be horizontal, allowing initial tilt (pitch and roll angles) to be assigned. Convolution is then performed over a set of discrete angles corresponding to rotation about the yaw axis only, to provide an estimate of the yaw or horizontal orientation of the target relative to the reference data The estimate of horizontal orientation found in the previous stage allows the vertical orientations to be estimated independently, if required, by performing rotational convolution with sets of angles varying about the pitch and roll axis. In this way, the 3D search of orientation is broken down into three 1D searches, decreasing the computational complexity substantially. In many embodiments however, the initial estimates of the vertical orientations based on the ground plane will be sufficient, and rotational convolution need only be performed about a single axis.

Figure 4:
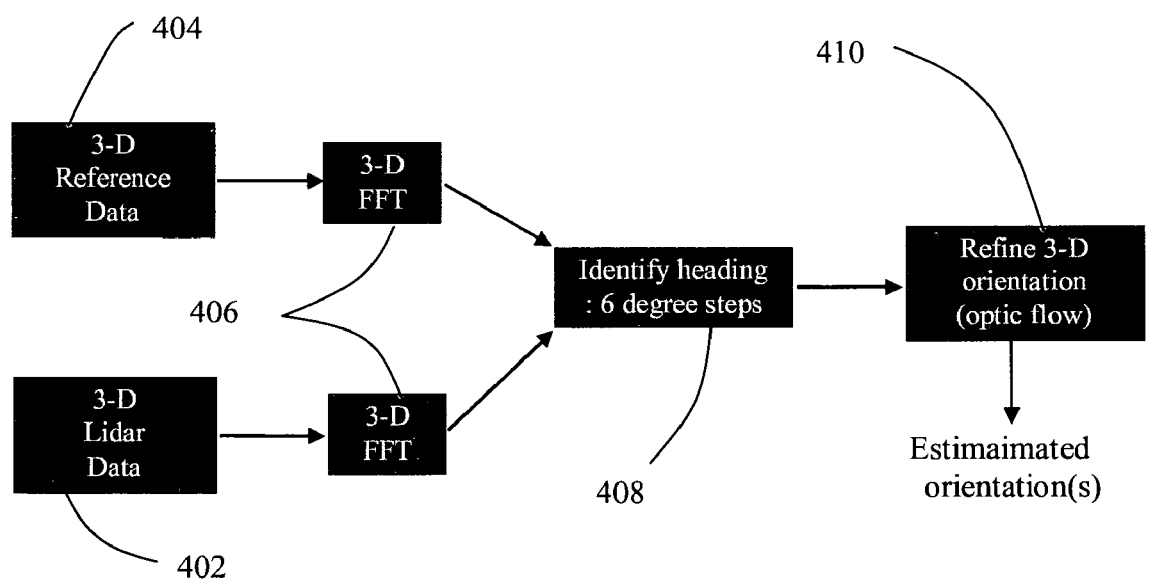
FIG. 4 illustrates a target recognition process according to an embodiment of the invention.

Referring to FIG. 4, the pre-processed 3D target data 402 and 3D reference data 404 are both subject to an FFT 406. At this stage the modulus of each data set is taken and the results interpolated onto a sphere for comparison at stage 408. Here rotational convolution is performed, firstly for a set of angles about a yaw axis to produce a horizontal estimate of orientation, and subsequently about pitch and roll axes to produce estimates of vertical orientation in each of the two senses. The rotational convolution identifies the most likely orientation of the target to an accuracy which depends on the discrete set of angles chosen for convolution. Here increments of six degrees are used to reduce computational complexity. In order to refine the estimate of orientation further, an optic flow stage 410 is provided, as described in greater detail below.

Optic Flow

Due to the discrete set of possible orientations for the previous steps the chosen orientation and tilt angles are estimates of the actual target orientation. This estimate can usefully be refined for a more accurate comparison between the target and the reference model. In this example, an Optic Flow technique is employed. Optic Flow is the process of calculating how individual parts of the image (3D signature of the target in our case) flow (translate and rotate) to the subsequent image (3D signature of the reference model).

The first step is to rotate the target by the rotation defined by the chosen orientation and tilt angles, and compute a new translation invariant signature for the rotated target, as described previously. Optic Flow does not benefit from the interpolation of this signal onto the surface of a sphere (and may suffer from interpolation artefacts), so the full volume of the Fourier signature is used. The aim of Optic Flow is to derive a displacement field v, sometimes called the flow field, which defines the following correspondence between two images I and J:

$$J(x) \leftrightarrow I(x+v(x))$$

Where x defines the location within the image. The arrow sign indicates that identity is note required, merely a close correspondence.

Generally speaking, Optic Flow is used, with 3D images, to find six variables, three translations and three rotations, which represent how the first image is transformed (flowed) to the second image. However, translations can be ignored here since the data is made translation invariant. Therefore, the only unknown variables are the three rotations.

The basic equation of optic flow is derived by assuming a conservation of image brightness under displacement (replacing the arrow by equality) and using a first-order Taylor expansion of the right hand side of the above equation:

$$J - I = -\nabla I \cdot v$$

This equation is an under-constrained partial differential equation. Additional constraints are therefore required to regularise this, and the usual approach is to assume a locally constant displacement field, resulting in a set of linear equations in at more than one point:

$$J(x_k) - I(x_k) = -\nabla I(x_k) \cdot v \quad k=1, \ldots, n$$

Where, at the points $x_1, \ldots, x_n$ the same displacement v is assumed. Usually more than two points are used, resulting in over-determined equations. This displacement is usually derived by minimising the sum-of-squares difference between the LHS and RHS of the above equation. The points $x_1, \ldots, x_n$ are usually configured as a contiguous square block of pixels centred at the point for which the optic flow is to be estimated. In this case, the least-squares solution is analogous to minimising the following cost function:

$$E(v) = \int\int_P\int (J(x) - I(x+v))^2 dx$$

Where P is the region over which it is assumed the displacement field is constant.

We introduce the following model for v within each region P:

$$v(x) = \sum_{k=1}^{m} a_k V_k(x)$$

Where $V_k$ are prescribed displacement fields on P, and $a_k$ are scalar parameters, which are calibrated from the image data. The algorithm uses a gradient-based approach, in which the Taylor expansion of E in $a_k$ is computed to second order, and the minimum of this quadratic form is derived by solving a set of linear equations in $a_k$. The first derivatives are given by:

$$\frac{\partial E}{\partial a_i} = -2\int\int_P\int (J(x)-I(x+v))\sum_{p=1}^{3}\frac{\partial I}{\partial x_p}V_{i,p}dx$$

Where $$V_i = \begin{pmatrix} V_{i,1} \\ V_{i,2} \\ V_{i,3} \end{pmatrix},$$

and the second derivatives by:

$$\frac{\partial^2 E}{\partial a_i \partial a_j} = 2\int\int_P\int \sum_{p=1}^{3}\frac{\partial I(x+v)}{\partial x_p}V_{i,p}\sum_{q=1}^{3}\frac{\partial I(x+v)}{\partial x_q}V_{j,q}dx$$

The difference between the reference model signature and the target signature being rotated is minimised. The ATR algorithm defines $V_k$ (the prescribed displacement fields on P) to be the three possible rotations in three-dimensional space.

$$V_1(x,y,z) = \begin{pmatrix} 0 \\ -z \\ y \end{pmatrix}$$

$$V_2(x,y,z) = \begin{pmatrix} -z \\ 0 \\ x \end{pmatrix}$$

$$V_3(x,y,z) = \begin{pmatrix} -y \\ x \\ 0 \end{pmatrix}$$

Translations are not considered because this part of the algorithm is invariant to translation. At the minimum the scalar variables $a_k$ can be derived, these define the magnitude of each of the three rotations that rotations represent the refined rotation that should correctly orientate the models.

Translational Convolution

Once the orientation has been found, the degrees of freedom involving rotations are no longer considered, thus reducing the remaining problem to three degrees of freedom; translation along each of the three axes. A three dimensional convolution is used to find the optimal translation that best fits the LIDAR data with the reference model.

The convolution of two functions $f(x)$ and $g(x)$ over an infinite range is given by $$f * g \equiv \int_{-\infty}^{\infty} f(x)g(t-r)dr = \int_{-\infty}^{\infty} g(x)f(t-r)dr$$

Where $f*g$ denotes convolution of $f$ and $g$. Fourier cyclic convolution is used to find the optimal translation for the models, because of the properties of Fourier transforms; the result of a convolution between two functions $f$ and $g$ is equivalent to the result of the multiplication of the two functions in Fourier space F and G, or more concisely $$F \cdot G = f * g$$

The use of three dimensional smoothing would allow for the algorithm to match targets with small differences in their shape, making the algorithm more robust. This smoothing involves convolving the data with a 3×3×3 Hanning window.

As a final step before calculating a score for the match between the target and the reference model, both the calculated orientation and translation are refined to maximise potential ATR performance. This process uses essentially the same Optic Flow process as for the orientation refinement. The Optic Flow algorithm now has to calculate six variables, three rotations and now three translations. A translation invariant signature is not used here as are a translation refinement is being calculated; therefore the algorithm uses the target and reference model data in a smoothed 3D grid format.

3D Correlation

Now the models should be orientated in the same direction and be located at the same point. If the classes of the models are the same and the correct orientation is being tested then the two models should lie exactly on top of each other. A normalised correlation is performed on the smoothed models to find a correlation score for the comparison of the two models at the orientation given.

When this process is completed for each of the rotations being tested, the maximum correlation score represents the score for the best match between the LIDAR data and the reference model it is being tested against. If the score is above the classification threshold (a pre-determined minimum score for a possible match between the target and reference model) and it is the highest scoring match between the target and all tested reference models, then the target is determined to be of the same class as that reference model.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of target recognition comprising the steps of:
providing a set of 3D data corresponding to a reference object;

obtaining a set of 3D data corresponding to a target object;

deriving a translation invariant 3D signature for each of the 3D data sets;

comparing the translation invariant 3D signatures for the reference object and the target object to derive an estimate of the orientation of the target with respect to the reference data;

bringing the target data and reference data into rotational alignment according to said derived estimate of orientation; and comparing the aligned target data with the reference data and deriving a measure of similarity based on said comparison.

2. A method according to claim 1, wherein the 3D target data and the 3D reference data are represented on an axisymmetric surface.

3. A method according to claim 2, wherein the 3D target data and the 3D reference data are represented on the surface of a sphere.

4. A method according to claim 1, wherein the translation invariant 3D signature of a data set is derived from a modulus of the 3D transform of that data set.

5. A method according to claim 4, wherein the transform is a Fast Fourier Transform.

6. A method according to claim 1, wherein comparison of the 3D target data and the 3D reference data comprises 3D rotational convolution.

7. A method according to claim 1, wherein comparison of the 3D target data and the 3D reference data is performed over a discrete set of selected rotation angles.

8. A method according to claim 7, wherein a first subset of angles are selected varying only about a first axis.

9. A method according to claim 8, wherein said first axis is selected based on an estimate of a local terrain gradient.

10. A method according to claim 1, wherein said 3D data corresponding to said target comprises a plurality of defined 3D points.

11. A method according to claim 10, wherein each point is measured as range and direction values relative to a given viewpoint.

12. A method according to claim 1, wherein said 3D data corresponding to said target is obtained by 3D laser imaging.

13. A method according to claim 1, further comprising comparing the rotationally aligned 3D target data and the 3D reference data to derive an estimate of a position of target with respect to the reference data;

bringing the target data and the reference data into translational alignment according to said estimate of position.

14. A method according to claim 1, wherein the derived estimate of the orientation of the target with respect to the reference data is refined by calculating an optic flow between the 3D target data and the 3D reference data.

15. A method according to claim 14, wherein calculating the optic flow comprises rotationally aligning the target data and the reference data according to an initial estimate of orientation;

deriving a translation invariant signature for the rotationally aligned data sets; and determining the displacement field between the signatures.

16. A method according to claim 1, wherein hidden surface removal is applied to a reference model.

17. A method according to claim 1, wherein a correlation score is obtained for the estimated orientation, and hidden surface removal is employed selectively in dependence upon said correlation score.

* * * * *